(12) United States Patent
Jeh et al.

(10) Patent No.: US 8,145,636 B1
(45) Date of Patent: Mar. 27, 2012

(54) CLASSIFYING TEXT INTO HIERARCHICAL CATEGORIES

(75) Inventors: Glen M. Jeh, San Francisco, CA (US); Beverly Yang, Cupertino, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 12/404,232

(22) Filed: Mar. 13, 2009

(51) Int. Cl. *G06F 17/30* (2006.01)
(52) U.S. Cl. ........ 707/736; 707/748; 707/749; 707/750; 707/754
(58) Field of Classification Search .................. 707/706, 707/750, 754, 736, 748–749
See application file for complete search history.

(56) References Cited

U.S. PATENT DOCUMENTS

| | | | |
|---|---|---|---|
| 6,691,108 B2* | 2/2004 | Li | 707/710 |
| 7,440,968 B1* | 10/2008 | Oztekin et al. | 1/1 |
| 2003/0018659 A1* | 1/2003 | Fuks et al. | 707/500 |
| 2003/0227925 A1* | 12/2003 | Matsuo et al. | 370/395.32 |
| 2006/0143175 A1* | 6/2006 | Ukrainczyk et al. | 707/6 |
| 2008/0168135 A1* | 7/2008 | Redlich et al. | 709/204 |
| 2009/0006396 A1* | 1/2009 | Dunlap et al. | 707/6 |
| 2009/0132373 A1* | 5/2009 | Redlich | 705/14 |

OTHER PUBLICATIONS

Wikipedia, "Precision and Recall," Feb. 16, 2009.
C. J. van Rijsbergen, "Information Retrieval," Ch. 3 Automatic Classification available at http://www.dcs.gla.ac.uk/Keith/pdf/Chapter3.pdf 1979.
Uqam, "N-Gram Phrase Extractor," http://www.er.uqam.ca/nobel/r21270/cgi-bin/tuples/u_extract.html, Feb. 24, 2009.
Wikipedia, "tf-idf," Mar. 1, 2009.
"N-Gram Extraction Tools," http://homepages.inf.ed.ac.uk/s0450736/ngram.html, Feb 24, 2009.

* cited by examiner

Primary Examiner — Hanh Thai
(74) Attorney, Agent, or Firm — Fish & Richardson P.C.

(57) ABSTRACT

Systems, methods and program products for classifying text. A system classifies text into first subject matter categories. The system identifies one or more second subject matter categories in a collection of second subject matter categories, each of the second categories is a hierarchical classification of a collection of confirmed valid search results for queries, in which at least one query for each identified second category includes a term in the text. The system filters the identified categories by excluding identified categories whose ancestors are not among the first categories. The system selects categories from the filtered categories based on one or more thresholds in which a threshold specifies a degree of relatedness between a selected category and the text. The selected categories are a sufficient basis for recommending content to a user, the content being associated with one or more of the selected categories.

24 Claims, 9 Drawing Sheets

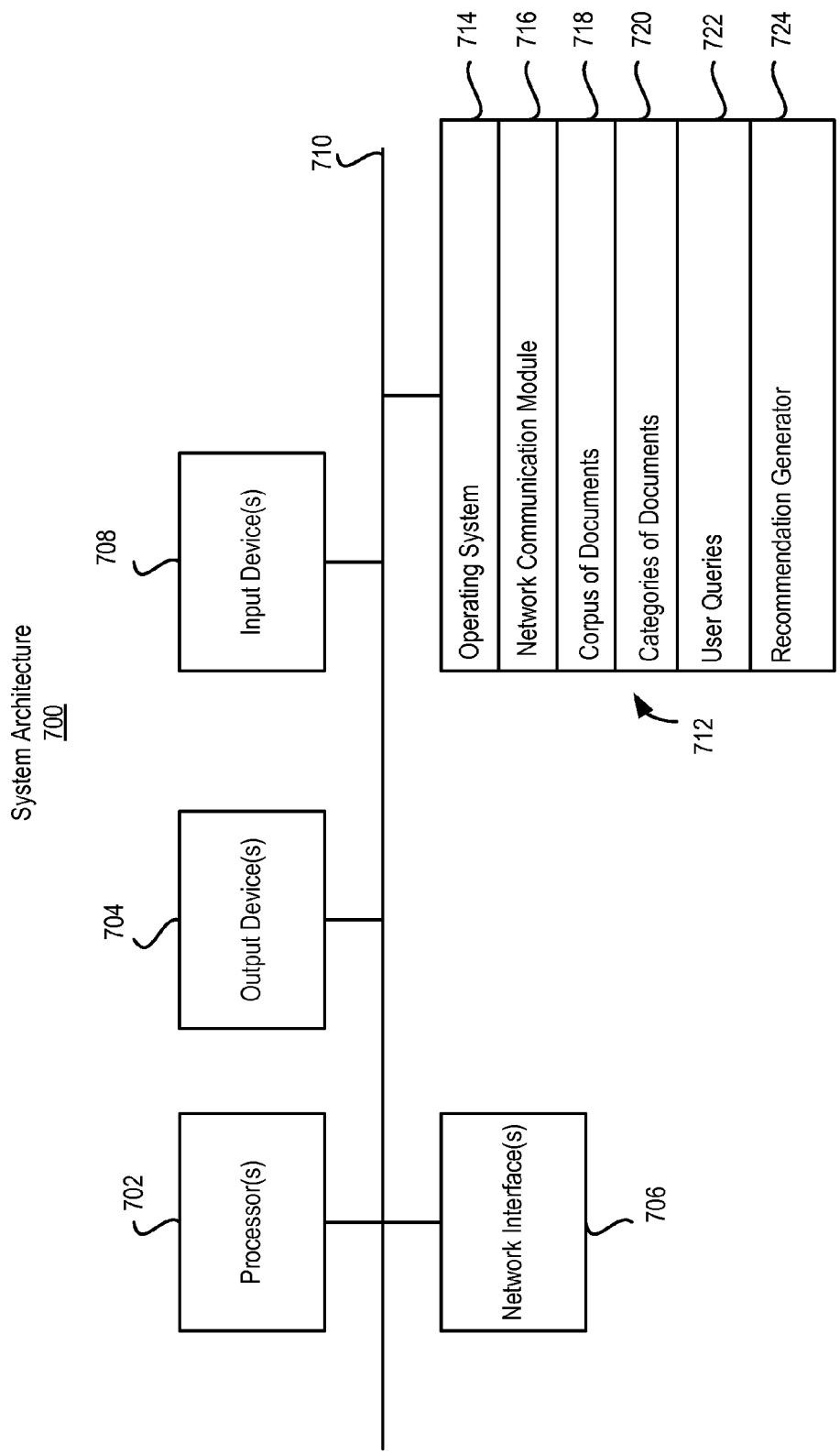

CLASSIFYING TEXT INTO HIERARCHICAL CATEGORIES

BACKGROUND

Text classification techniques can be used to classify text into one or more subject matter categories. Text classification/categorization is a research area in information science that is concerned with assigning text to one or more categories based on its contents. Typical text classification techniques are based on naive Bayes classifiers, tf-idf, latent semantic indexing, support vector machines and artificial neural networks, for example.

SUMMARY

In general, one aspect of the subject matter described in this specification can be embodied in a method that includes classifying text into first subject matter categories. One or more second subject matter categories are identified in a collection of second subject matter categories, each of the second subject matter categories being a hierarchical classification of a collection of confirmed valid search results for queries, and where at least one query for each identified second subject matter category includes a term in the text. The identified subject matter categories are filtered by excluding identified subject matter categories whose ancestors are not among the first subject matter categories. Subject matter categories are selected from the filtered subject matter categories based on one or more thresholds where a threshold specifies a degree of relatedness between a selected subject matter category and the text. The selected subject matter categories are a sufficient basis for recommending content to a user, the content being associated with one or more of the selected subject matter categories. Other embodiments of this aspect include corresponding systems, apparatus, and computer program products.

These and other embodiments can optionally include one or more of the following features. Selecting subject matter categories can further include for each subject matter category in the filtered subject matter categories, extracting one or more n-grams from the queries of whose confirmed valid search results the subject matter category is the hierarchical classification of, where the n-grams appear in the text; calculating an initial weight of the subject matter category, the calculating including determining a sum of term frequency-inverse document frequency (tf-idf) values of each extracted n-gram in relation to a corpus of documents; selecting the subject matter category based on the initial weight and the thresholds; and determining a confirmed valid search result.

Selecting the subject matter category can further include calculating a number of distinct n-grams in the extracted n-grams; selecting the subject matter category as a first selected subject matter category if the number of distinct n-grams satisfies a first threshold; identifying one or more n-grams from the extracted n-grams, the identified n-grams matching a refinement in a hierarchy in the first selected subject matter category, the refinement having a level in the hierarchy; boosting the initial weight of the first selected subject matter category by a first boost value to acquire a first boosted weight, the first boost value commensurate with the level of the refinement; boosting the first boosted weight by a second boost value to acquire a second boosted weight, the second boost value commensurate with a total number of n-grams in the extracted n-grams; and selecting the first selected subject matter category if the second boosted weight of the first selected subject matter category satisfies a second threshold.

Calculating a tf-idf value of each extracted n-gram can include calculating an inverse document frequency (idf) value of the n-gram in relation to the corpus of documents; calculating a term frequency (tf) value of the n-gram; and determining the tf-idf value of the extracted n-gram based on the idf value of the n-gram and the tf value of the n-gram.

Calculating the idf value of the n-gram can include calculating an idf quotient, the calculating including dividing a total number of documents in the corpus by a number of documents in which the n-gram appears.

Calculating the tf value of the n-gram can include dividing a number of times the n-gram appears in the text by a length of the text.

Calculating the tf value of the n-gram can include for each confirmed valid search result for the queries from which the n-gram is extracted, dividing a number of times the n-gram appears in the search result by a length of the search result to obtain a relative term frequency; and applying the relative term frequency to the tf value of the n-gram.

Determining a confirmed valid search result can include receiving a search query; presenting one or more search results responsive to the search query; and receiving a selection of at least one search result from the one or more search results, the selection designating the confirmed valid search result.

Particular implementations of the subject matter described in this specification can be utilized to realize one or more of the following advantages. Text can be classified into a large number of fine-grained target categories while maintaining high precision and recall. Techniques described herein can be combined with existing text classification techniques to improve existing text classification techniques. This allows for more relevant content recommendations to be made to a user. When a user seeks particular articles from a repository of articles based on the category of the articles, fine-grained categories of the articles can lead to precise results. When a user browses a repository of articles based on category, fine-grained categories of the articles can make the browsing more refined and targeted.

The details of one or more implementations of the subject matter are set forth in the accompanying drawings and the description below. Other features, aspects, and advantages of the subject matter will become apparent from the description, the drawings, and the claims.

DESCRIPTION OF DRAWINGS

FIG. 7 is a block diagram of a system architecture for implementing the features and operations described in reference to FIGS. 1-6.

Like reference symbols in the various drawings indicate like elements.

DETAILED DESCRIPTION

Figure 1A:
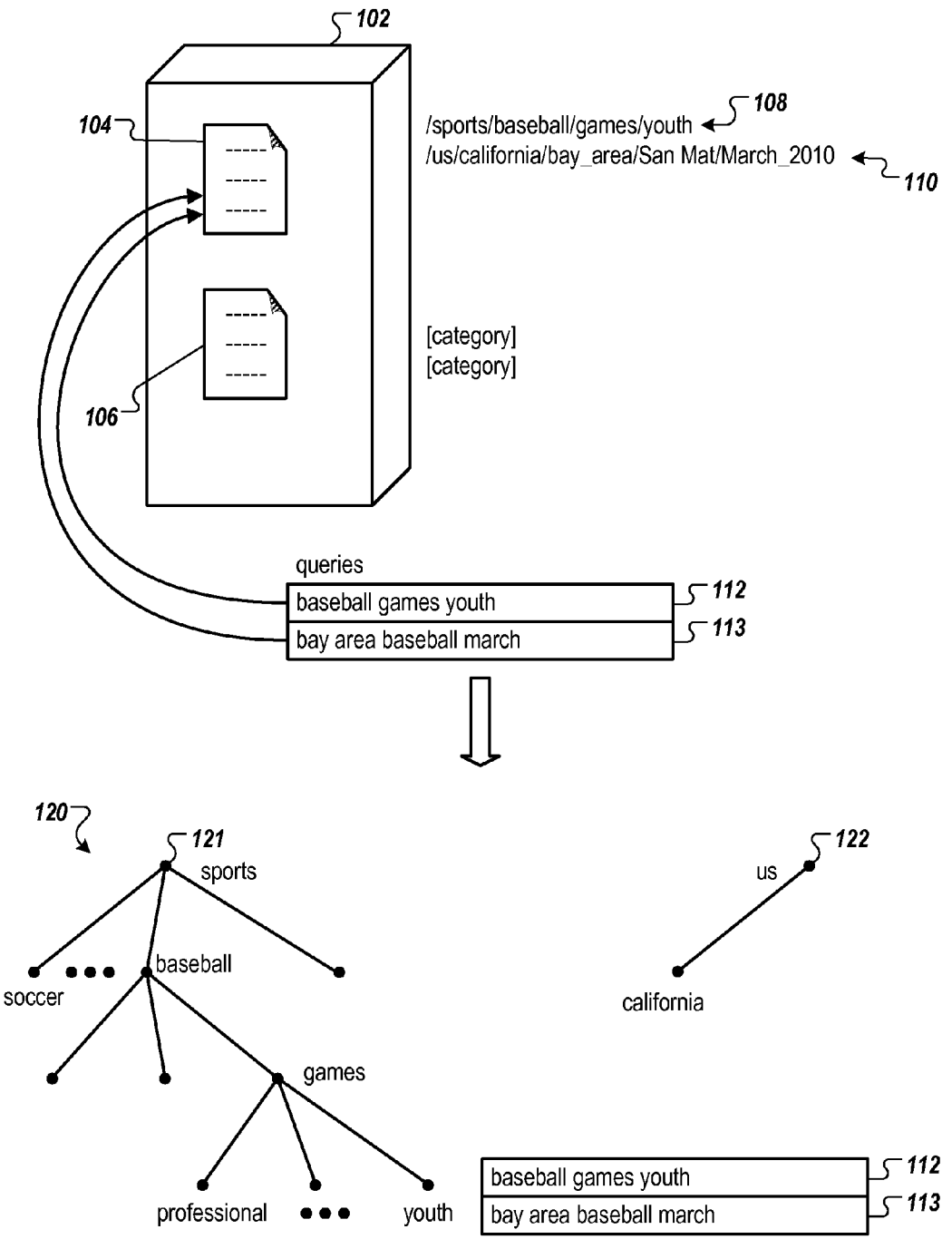
FIGS. 1A and 1B illustrate example techniques for classifying text into hierarchical categories using a combination of text classifiers.
Figure 1B:
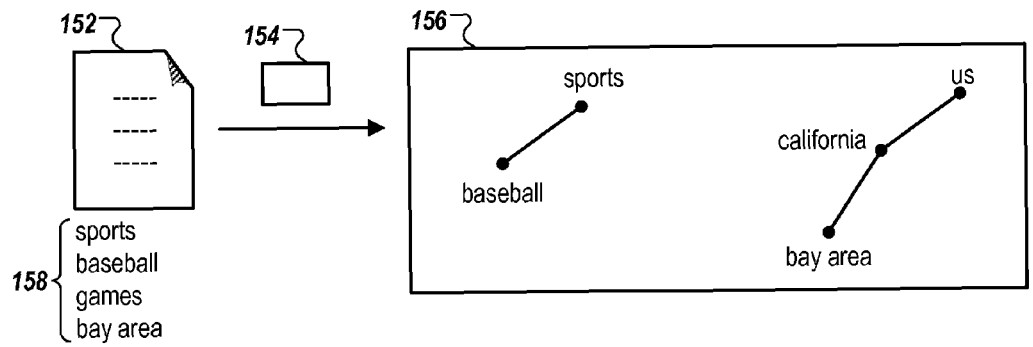
Figure 1B:
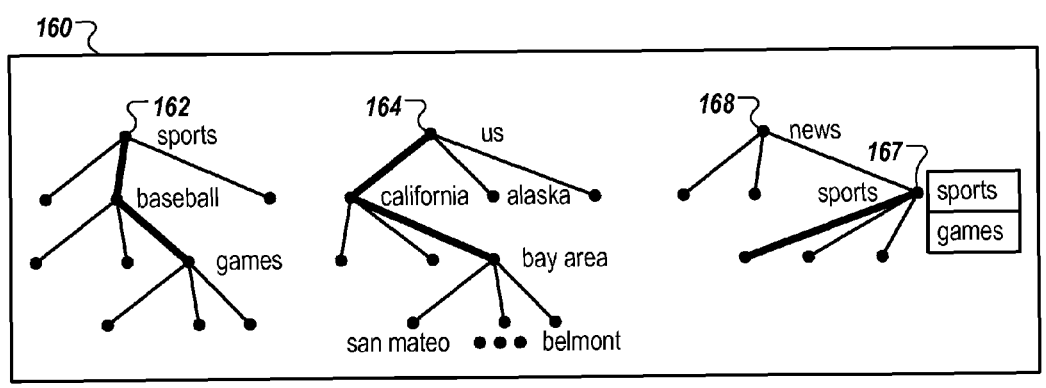
Figure 1B:
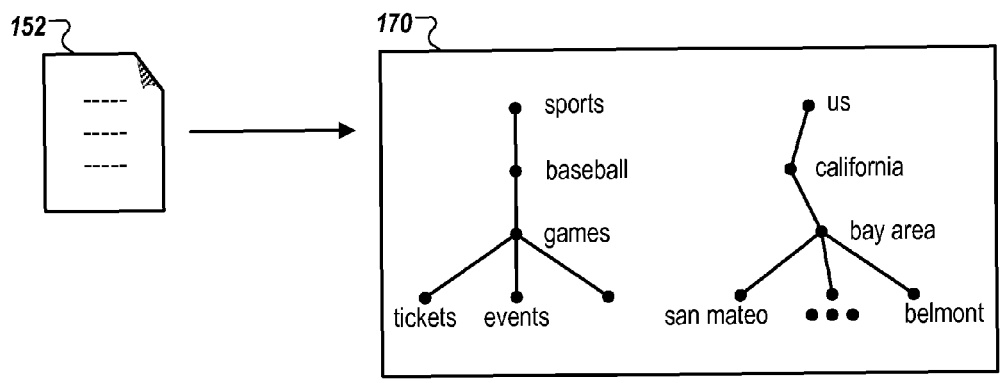

FIGS. 1A and 1B illustrate example techniques for classifying text 152 into hierarchical categories 170 using a combination of text classifiers. For convenience, the example techniques will be described with respect to a system that performs the techniques. The terms "subject matter category" and "category" are used interchangeably in this specification. A category is a hierarchical classification of content. Categories can have subcategories in parent-child relationships with each other based their relative position in a hierarchy. For example, a category 108 is "/sports/baseball/games/youth," which is comprised of the category "sports", its subcategory "baseball", a further subcategory "games", and a final subcategory "youth." A subcategory's depth in the hierarchy reflects its level of refinement. A detailed category can be a category that contains at least three or four subcategories, for example. Content can belong to more than one category. By way of illustration, document 104, in addition to belonging to a category 108, can also belong to a category 110 "/us/california/bay_area/san_mateo/march_2010."

Generally speaking, in various implementations the system classifies text 152 such as a web page or other document, for instance, into one or more high-level categories 156 using a high-level text classifying program 154 such as, for example, a naive Bayes classifier or other technique. The system then associates the text 152 with a collection of detailed categories. The detailed categories are a subset of categories of existing content (e.g., Web pages and other electronic documents). The categories of existing content can be based on, for example, a directory created by the Open Directory Project (ODP) available at http://www.dmoz.org/. The system determines to which of the detailed categories the text 152 belongs to by examining whether a match exists between terms in the text 152 and user queries that are related to the detailed categories.

The system uses the high-level categories 156 to filter the detailed categories to which the text 152 is associated. Among the detailed categories to which the text 152 is associated, those detailed categories that can trace their ancestor (e.g., parents, grand-parents, and so on) to a high-level category in the high-level categories 156 are preserved. Those detailed categories that cannot trace their ancestor to a high-level category in the high-level categories 156 are excluded from the filtered categories.

The system can further limit the number of filtered detailed categories to which the text 152 is associated by calculating a weight for each filtered detailed category. The weight measures a degree of relatedness between the filtered detailed category and the text 152. In various implementations, the weight is calculated from various factors, e.g., how popular the filtered detailed category is among users, how many words in the text 152 match the queries linked to the filtered detailed category, etc. The filtered detailed categories that are sufficiently related to the text 152 are selected and designated as the detailed categories of the text 152. The detailed categories can be used as a basis for recommending content to a user.

The system can recommend content based on, for instance, the detailed categories of a Web page that the user is viewing in a main frame of a Web browser. The recommended content is displayed on a side frame of a web page, for example.

In some implementations, the detailed categories are represented in the system as a detailed category graph 120 or 160. The known categories of existing content are represented as a system category graph 120. And the collection of detailed categories that is associated with the text 152 is represented as a comprehensive category graph 160. For example, category graphs 120 and 160 are a system category graph and a comprehensive category graph, respectively. Each of the graphs is a directed acyclic graph ("DAG") where nodes in a graph represent categories and edges between nodes represent the parent-child hierarchical relationships of the categories represented by the graph. The DAG can be a tree or a forest, for instance.

FIG. 1A illustrates example techniques for generating a system category graph 120 from a corpus 102 of documents and user queries 112 and 113. Each category in the system category graph 120 (as well as the comprehensive category graph 160) can be associated with content and queries. The categories and queries in the system category graph 120 are linked together by content. If there is an item of content that is a search result of a query and the content belongs to a category, the category is linked to the query. Content can be electronic documents (e.g., documents 104 and 106), or references to electronic documents. For example, content can be a pointer, an index, or a Universal Resource Locater ("URL") referring to electronic documents 104 and 106. Electronic documents 104 and 106 can be Web pages or other documents in a corpus 102 of documents. A corpus 102 of documents is a space of documents that a search engine can access (e.g., the World Wide Web, a database, or a file system). Other corpora are possible.

Queries 112 and 113 are associated with the system category graph 120 and are search queries submitted by one or more populations of users. By way of illustration, users can perform searches using Internet search engines to retrieve content. To perform searches, users can submit search queries 112 and 113 from web browsers or other processes to the search engines. The number of times that users submit a query can be tracked. The tracked number can be designated as a query count of the query. Queries (e.g., 112 and 113) submitted by a collection of users over a time period can be stored on a storage device in association with query counts. For example, query 112 can be "baseball games youth," which is stored in a corpus of queries. Query 112 can have a query count of 300, indicating that the query 112 has been submitted 300 times. Similarly, and as another example, query 113 has been submitted 150 times and has a query count of 150.

The queries 112 and 113 can contain one or more n-grams. An n-gram is a sequence of items from a query. An item in a query can be a part of a word (e.g., "ism"), a word (e.g., "tv"), or a compound that includes more than one word (e.g., "bay area"). An n-gram of the query can be the query in its entirety (i.e., all the items in the query). For example, query 112 "baseball games youth" contains three unigrams ("baseball," "games," and "youth"), two bigrams ("baseball games," "games youth") and one trigram ("baseball game youth," which contains all the items in the query). The n-grams in the queries 112 and 113 can be used in a matching process, which will be described below.

Example system category graph 120 illustrates relationships between categories and n-grams in queries. A category graph can contain paths that correspond to categories and nodes that correspond to refinements. Example system category graph 120 is a forest that contains two trees 121 and 122, and nodes "sports," "us", "soccer," etc.

Categories can be organized in parent-child relationships based on the hierarchy in the categories in tree 121. A path from a root to a non-root node can represent a category. For example, a root of category tree 121 can correspond to the top level component "sports" in category 108 and represent a category "/sports." A child (e.g., "games") of a node (e.g., "baseball") is a refinement of the category represented by the node (e.g., "/sports/baseball"). A node can have many children, each child corresponding to a distinct refinement of a category represented by the node. Nodes in example category tree 121 "sports," "baseball," "games," and "youth" each represents a category "/sports," "/sports/baseball," "/sports/baseball/games," and "/sports/baseball/games/youth."

In general, a category can be linked to a query if the category is a hierarchical classification of content that is a confirmed valid search result of the query. When a user submits a query, a search engine returns a collection of content as search results. When a user selects an item in the search results, the user's act of selection can be considered a confirmation that the selected item is a validly search result of the user's query. Therefore, the user's selection can be designated as the confirmed valid search result of the query. The subject matter category of the selected content can be linked to the query based on the selection. In example category tree 121, the node "youth," which represents category "/sports/baseball/games/youth," is linked to queries 112 and 113 through document 104.

For example, for the 300 user submissions of query 112 "baseball games youth," a search engine can present a URL pointing to document 104 to the users a number of times. If a user clicks on the URL, the click can be considered a confirmation that document 104 is a valid search result for query 112. Therefore, the categories 108 and 110 can be associated with query 112 in the system category graph 120. In example category tree 121, node "youth," corresponding to category "/sports/baseball/games/youth," is thus linked to queries 112 and 113 through document 104.

Furthermore, a confirmation count can be calculated for the query in relation to the category, indicating how may times users have selected content belonging to the category. In this example, document 104 can be presented to a user in response to query 112 "baseball games youth" many times. The confirmation count for category 108 in relation to query 112 can be three, indicating that users have clicked three times on links to documents belonging to the category 108 "/sports/baseball/games/youth" (e.g., document 104), out of the many times documents belonging to various categories have been presented. Therefore, documents belonging to the category 108 (e.g., document 104) can link category 108 to query 112.

When a category in a system category graph 120 is linked to a query, the system can associate the category with the n-grams in the query. An n-gram that is associated with a category through a query is a supporter of the category. The category can have a supporter count in relation to a supporter. In some implementations, a supporter count of an n-gram associated with a category is the total number of times the n-gram has been submitted in the queries that are linked to the category. For example, in category tree 121, category 108 "/sports/baseball/games/youth" is linked to queries 112 and 113. Therefore, the n-grams in queries 112 and 113, including the queries 112 and 113 in their entireties, are supporters of the category 108. A supporter count can be calculated based on the confirmation counts for a category in relation to all queries linked to the category. TABLE 1 illustrates the supporter counts of the n-grams associated with category 108 in category tree 121. Note that "bay area" can be a single item because it is a compound.

TABLE 1

| N-GRAM | SUPPORTER COUNT |
| --- | --- |
| Baseball | 18 (3 appearances in query 112, 15 appearances in query 113) |
| Games | 3 |
| Youth | 3 |
| Baseball games | 3 |
| Games youth | 3 |
| Baseball games youth | 3 |
| Bay area | 15 |
| March | 15 |
| Bay area baseball | 15 |
| Baseball march | 15 |
| Bay area baseball march | 15 |

In various implementations, the supporters of the category are specific n-grams in the query. For example, the supporters of the category can include the queries in their entireties and exclude other n-grams. Alternatively, the supporters of the category can include four-or-above-grams of the queries and exclude unigrams, bigrams, and trigrams.

FIG. 1B illustrates example techniques for classifying text 152 by combining a high-level text classifying program 154 with a comprehensive category graph 160. The text 152 can be an electronic document such as a Web page, an email message, or other content. The text 152 can be classified into one or more high-level categories 156 using the high-level text classifying program 154. The high-level categories 156 can have a hierarchical structure, but a hierarchical structure is not required to be present in the high-level categories 156. For example, the hierarchical high-level categories 156 of the text 152 can be "/sports/baseball" and "/us/california/bay_area." Terms 158 are extracted from the text 152. The terms 158 can be complete or partial n-grams of text 152. The system can extract terms 158 using publicly available n-gram extraction software programs.

The high-level categories 156 and the terms 158 of text 152 are used to identify detailed categories from a system category graph 120 and create a comprehensive category graph 160 in order to provide detailed categorization for text 152. Example comprehensive category graph 160 contains detailed categories associated with the n-grams in queries. The comprehensive category graph 160 has three trees 162, 164, and 166, the roots of which represent categories "/sports," "/us," and "/news," respectively. The comprehensive category graph 160 can contain unlimited number of levels. For illustrative purposes only, four levels are shown in the example comprehensive category graph 160.

In some implementations, a system can create a comprehensive category graph 160 for the text 152 from system category graph 120 by matching the terms 158 in the text 152 with the n-grams in the system category graph 120. If one or more of the terms 158 in the text 152 is a supporter of a category in system category graph 120, the category in the system category graph 120 can be identified as a detailed category of document 152, and can be included in the comprehensive category graph 160. The terms that support the category can be designated as related supporters. For example, in category tree 166, a node 167 represents category "/news/sports." The category "/news/sports" is supported by two unigrams "sports" and "games." The term "games" is among the terms 158 that are extracted from the text 152.

Therefore, at least one query that is linked to the category "/news/sports" includes the term "games" in the text 152. As a result, the category "/news/sports" can be associated with document 152 and included in the comprehensive category graph 160, and the term "games" can be designated as a related supporter.

The system can use the high-level subject matter categories 156 of the text 152 to filter the comprehensive category graph 160. In some implementations, the system can exclude categories in comprehensive category graph 160 whose ancestors are not among the high-level categories 156. The system can use the exclusion in order to eliminate a large number of detailed categories that have related supporters but are otherwise unrelated to document 104 because the detailed categories are in areas completely different from the text 152 (e.g., a detailed category "/computer/software/projects" can unrelated to text 152 which belongs to categories "sports/baseball" etc.) Details on excluding categories whose ancestors are not among the high-level categories will be described below.

The order in which the above-described operations are performed can be different in various implementations. In the examples above, the system creates a comprehensive category graph 160 before filtering the comprehensive category graph 160 using the high-level categories 156. In some implementations, the system can filter the system category graph 120 using the high level categories before generating a comprehensive category graph 160.

In various implementations, after filtering the categories in the comprehensive category graph 160, the system can further prune the filtered comprehensive category graph 160 to create a set of detailed categories 170 based on one or more thresholds in order to further excluding less relevant categories. Pruning a filtered comprehensive category graph 160 can include, but is not limited to, excluding a node or a branch from a category tree, or excluding an entire category tree. Pruning a filtered comprehensive category graph 160 can include discarding a category, marking a category, adding the category to a "do not use" list, and so on. More details on pruning a filtered comprehensive category graph are described below with respect to FIG. 4.

The detailed categories 170 are associated with the text 152. The detailed categories 170 can be designated as detailed hierarchical classification of text 152. The detailed hierarchical classification of the text 152 can be used as a basis for recommending content to a user.

Figure 2:
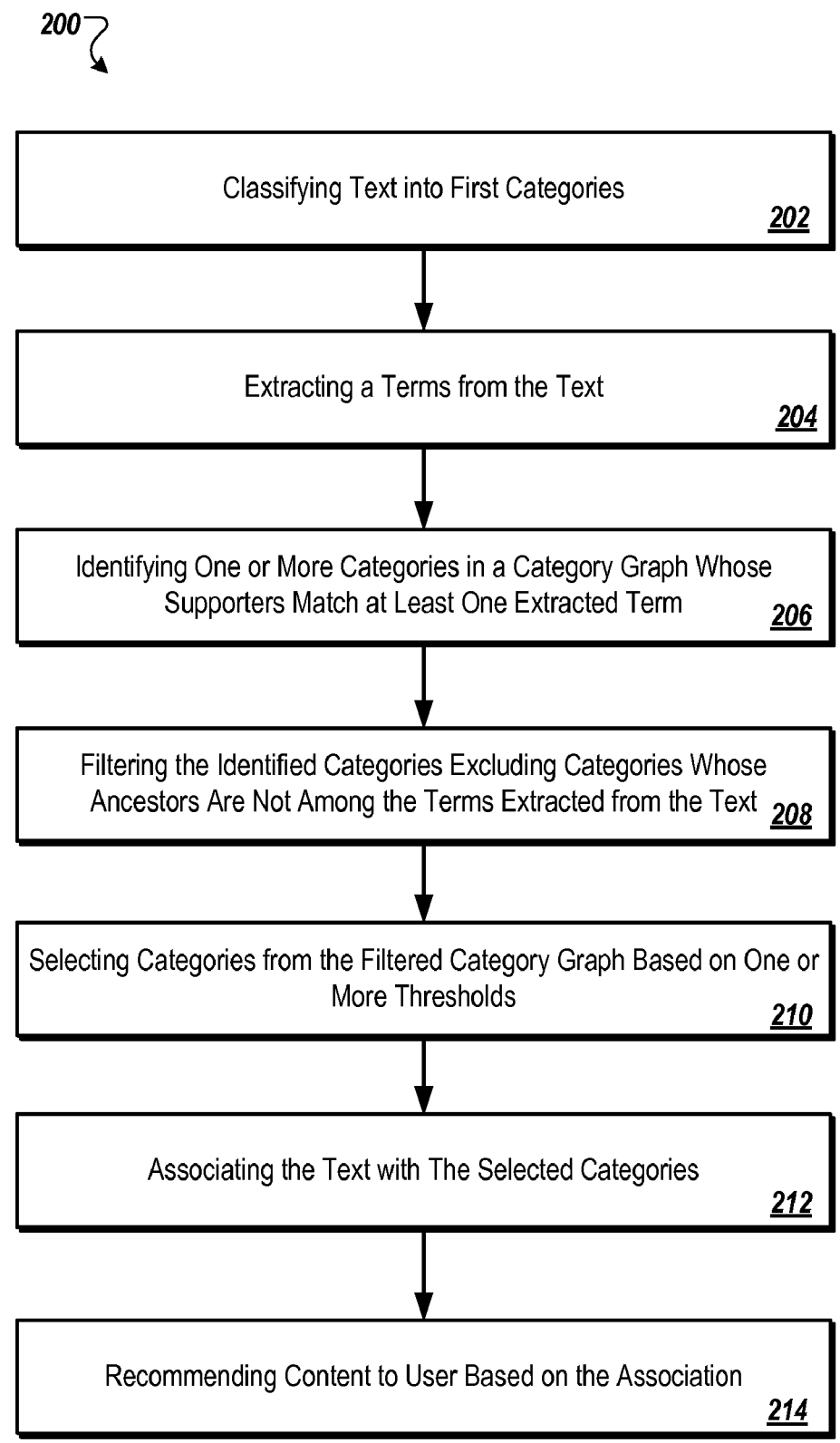
FIG. 2 is a flowchart illustrating example techniques for classifying text into hierarchical categories using a combination of classifiers.

FIG. 2 is a flowchart illustrating example techniques 200 for classifying text 152 into hierarchical categories using a combination of classifiers. In step 202, the text 152 is classified into high-level categories 156 by the high-level classifying program 154. The high-level classifying program 154 can be any computer-implemented text classifier, including commercially available software such as uClassify (available from www.uclassify.com) and C++ Text Classifier (available from www.codeode.com).

Generally, the quality of a classifier program can be measured by many factors, including recall and precision. When a text classifier classifies a particular string S into a particular category C, the classification can be a true positive (S belongs to C, and is classified as belonging to C), a true negative (S does not belong to C, and is classified as not belonging to C), a false positive (S does not belong to C, but is classified as belonging to C), and false negative (S belongs to C, but is classified as not belonging to C). The recall of a classifier can be defined as the number of true positives divided by the sum of true positives and false negatives. The higher the recall, the less likely the classifier will produce false negatives. The precision of a classifier can be defined as the number of true positives divided by the sum of true positives and false positives. The higher the precision, the less likely the classifier will produce false positives. An ideal, 100-percent accurate classifier's recall and precision values are both one.

The high-level classifying program 154 is not required to have high recall and high precision. In some implementations, a low-precision-high-recall classifying program is used.

In step 204, terms 158 are extracted from the text 152. The terms can be the n-grams of the text 152, extracted by an n-gram extractor. An n-gram extractor can be a publicly available text processing tool (e.g., N-Gram Phase Extractor, available at http://www.er.uqam.ca/nobel/r21270/cgi-bin/tuples/u_extract.html or N-Gram Extraction Tools, available at http://homepages.infed.ac.uk/s0450736/ngram.html). Extracting the terms 158 from the text 152 is not limited to extracting the n-grams from the body of the text 152. In some implementations, the terms 158 can be n-grams extracted from the title, metadata, or excerpt of the text 152.

In step 206, one or more detailed categories in a system category graph 120 are identified based on a match between the terms 158 extracted from the text 152 and the supporters of the detailed categories in the system category graph 120. The identification matches a detailed category in the system category graph 120 to the text 152 through the queries that are linked to the category. Categories that are not supported by any term in text 152 can be considered unrelated to the text 152 and can be excluded. If a query is linked to a detailed category, and the query contains an n-gram that is a term in the terms 158 from the text 152, then the detailed category can be identified. That is, if one or more of the terms 158 in the text 152 form a non-empty subset of one or more n-grams supporting a detailed category in the system category graph 120, the category can be identified. A comprehensive category graph 160 can include the detailed categories identified from the system category 120.

In some implementations, not all categories in system category graph 120 participate in the matching between the terms 158 and the n-grams in the system category graph 120. A category whose total supporter count (e.g., the number of all supporters) is too low can be excluded from a matching process. Excluding a category that has a low total supporter count can be a mechanism that can eliminate accidental categories. An accidental category is a subject matter category that contain errors, e.g., a typographical error in the ODP (e.g., "/sports/bassball/games"), or a subject matter category that has been created by an accidental user click on a wrong URL in the search results, which creates an unintended link between the category and the user's query. Categories in system category graph 120 can also be excluded for other reasons in order to eliminate incorrect classification of text 152.

In some implementations, a detailed category is not necessarily identified even if a term in the text is a related supporter to a detailed category. Some general terms (e.g., "a," "of," or "in") can be excluded from the matching. Some terms that are too long (e.g., 225-and-above-grams) can also be excluded from the matching. Therefore, for example, even if the terms 158 of the text 152 contains term "a" and a detailed category in the system category graph 120 is supported by a unigram "a," the detailed category is not automatically associated with the text 152.

The actual identification of a category and generation of comprehensive category graph 160 can be implemented in various ways. For example, an identification of a category can be made by setting an identification bit in a data structure storing the system category graph 120. Comprehensive category graph 160 can be created and augmented by copying the information of the category identified from the system category graph 120, or by creating references (e.g., pointers) to the identified category, etc.

In step 208, the comprehensive category graph 160 is filtered by excluding detailed categories whose ancestors are not among the high-level categories 156 generated by the high-level text classifying program 154. In a comprehensive category graph 160, categories that are supported by one or more terms 158 in the text 152, but whose ancestors are not among the high-level categories 156 can be considered not sufficiently related to the text 152.

For example, if high-level categories of a particular document are "/arts" and "/arts/music" and a term in the document is "beethoven," a detailed category "/arts/music/genres/classical/composers/beethoven" can be a category that is related to the document. However, consider a second detailed category "/computer/software/by_code_name/beethoven." The ancestors of the second detailed category are "/computer," "/computer/software," and "computer/software/by_code_name." The second category can be irrelevant to the document to be classified, even when the category is supported by a query containing a unigram "beethoven" which matches a term in the document. The system can determine that the second detailed category is irrelevant because none of the ancestors of the category is among the high-level categories "/arts" and "/arts/music." Therefore, the second category can be excluded from a comprehensive category graph of the document.

In step 210, detailed categories are selected from the filtered comprehensive category graph 160 based on one or more thresholds to create the set of selected detailed categories 170. A threshold can specify a degree of relatedness between a subject matter category in the comprehensive category graph 160 and the text 152. Given a large user population, a large number of documents available on the Internet, and a large number of categories, a comprehensive category graph 160, even if filtered, can contain an unmanageably large number of detailed categories. Selecting detailed categories based on threshold values can reduce the number of detailed categories that will be eventually associated with the text 152. Details on selecting detailed categories based on thresholds are described below with respect to FIGS. 3A and 3B.

In step 212, the selected detailed categories 170 are associated with the text 152 and designated as the detailed hierarchical classification of text 152. Associating the selected detailed categories 170 with the text can be implemented in a variety of ways. For example, the selected detailed categories can be added to the high-level categories 156 to form a DAG. The selected detailed categories can be stored in memory or on a mass storage device (such as a computer disk) in association with the text. The selected detailed categories 170 can also be displayed on a display device in response to a user request.

In step 214, content recommendations are made to users based on the association between the text 152 and the selected detailed categories 170. Content recommendations can be made by, for example, displaying links to the content being recommended on a user's display device next to a document a user is viewing. In some implementations, a document being or has been viewed by a user can indicate the user's interest. The document can be, for example, a Web page, an email message, or an instant message conversation ("a chat"). The text in the content can be classified into detailed categories. Other documents that belong to these detailed categories are likely to be of interest to the user. These other documents can be located in the document corpus 102, for example, by browsing the documents in the ODP directories that match the selected detailed categories 170. Links to and summaries of the documents thus located can be displayed on the user's display device, e.g., in a side bar on a browser screen.

Figure 3A:
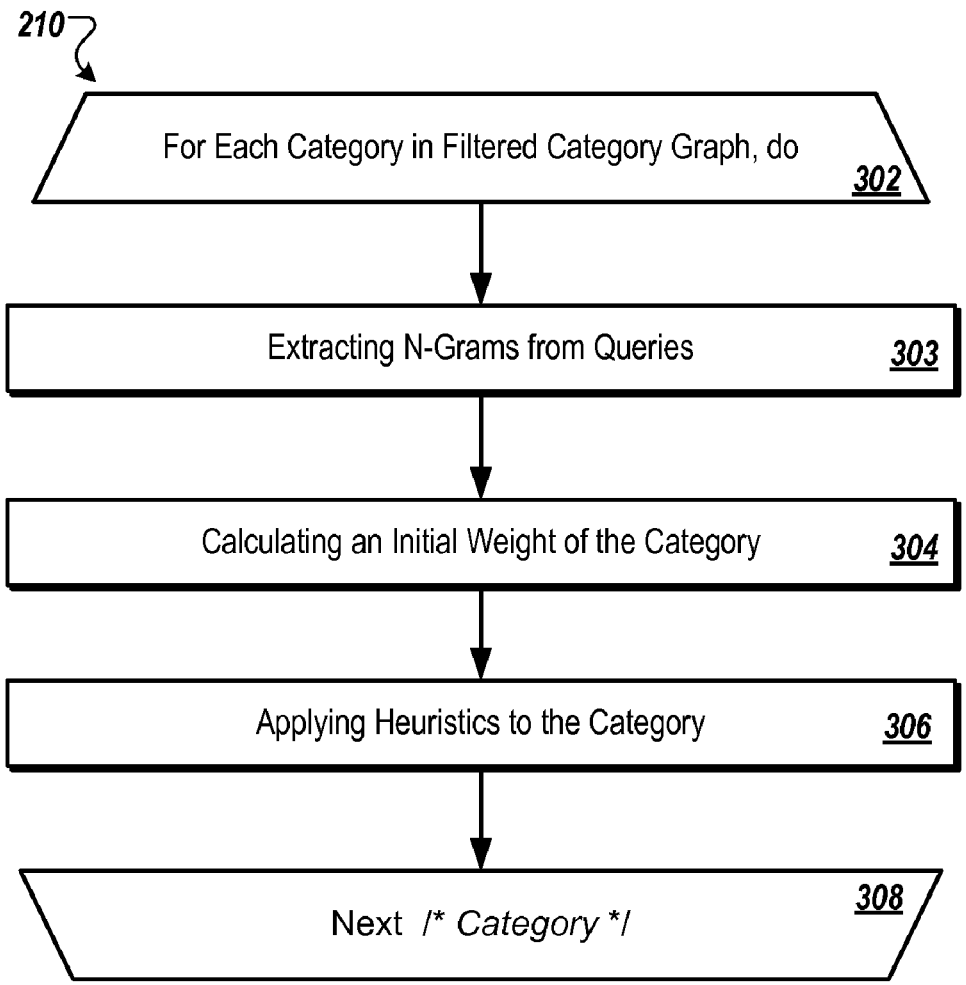
FIGS. 3A and 3B are flowcharts illustrating example techniques for selecting categories from a filtered comprehensive category graph.
Figure 3B:
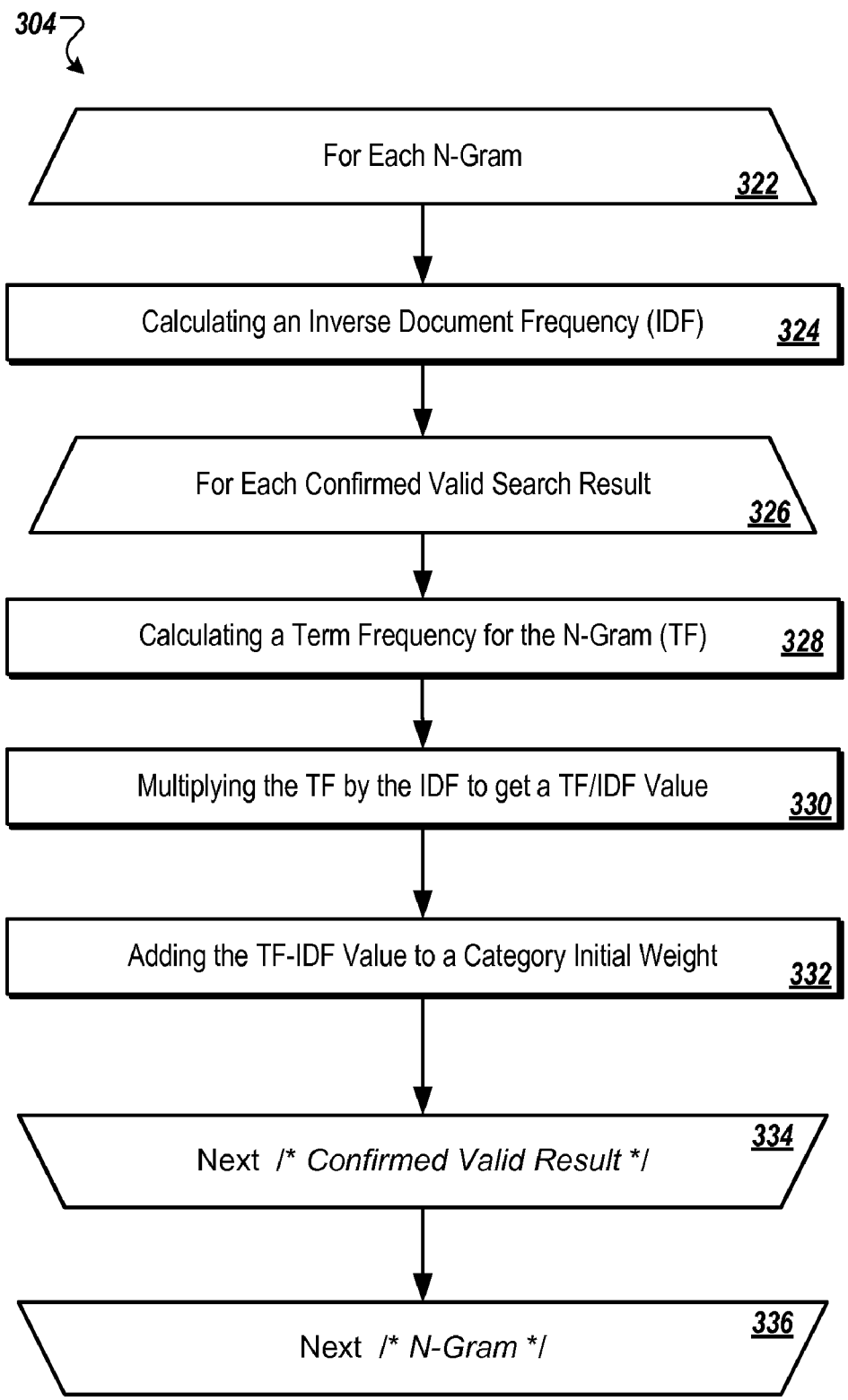

FIGS. 3A and 3B are flowcharts illustrating example techniques 210 for selecting categories from a filtered comprehensive category graph 160. In FIG. 3A, boxes 302 and 308 represent an iteration through a filtered comprehensive category graph 160. The iteration can be repeated for each category in the comprehensive category graph 160. For convenience, the steps 303, 304 and 306 will be described with respect to a category being iterated upon.

In step 303, the system extracts n-grams that are both in the text 152 and in the queries linked to the category. The system identifies the queries that are linked to the category by one or more confirmed valid search results (e.g., documents that are valid search results of the queries and also belong to the category). The system then extracts the n-grams from the identified queries. In some implementations, the system extracts the n-grams using a publicly available n-gram extraction tool. In some other implementations, the system uses the queries themselves as the n-grams of the queries. For example, for query 112 "baseball games youth," the trigram "baseball games youth" is extracted if the trigram appears in the text. The system ignores the unigrams and bigrams in the query 112.

In step 304, an initial weight of the category in the filtered comprehensive category graph 160 is calculated. A weight of a category can measure a relatedness between a category and a term in the text 152. In various implementations, a weight is determined by calculating an initial weight and then boosting the initial weight. Calculating an initial weight of a category can include determining a sum of term frequency-inverse document frequency ("tf-idf") values of the n-grams associated with the category (e.g., the supporters of the category). Details on example implementations of calculating an initial weight are described below with respect to FIG. 3B. Details on example implementations of boosting an initial weight described below with respect to FIG. 4.

In step 306, heuristics are applied to the category. The heuristics can select a category from a filtered category graph based on the initial weight of the category, on one or more iterations of boosting the initial weight, and one the one or more thresholds. Details on some example implementations of applying heuristics to select the category are described below with respect to FIG. 4.

In step 308, a termination condition for the iterations is examined. A termination condition can be a condition which, when satisfied, an iteration stops repeating. For example, an iteration repeated for each category in the filtered comprehensive category graph 160 can be stopped when all categories in the filtered comprehensive category graph 160 have been traversed.

FIG. 3B illustrates example techniques 304 for calculating an initial weight of a category. An initial weigh of a category can be a sum of tf-idf values of the n-grams associated with the category. In some implementations, the sum can be calculated by nest iterations, where an outer iteration of steps 332 through 336 traverses each n-gram supporting the category, and an inner iteration of steps 326 through 334 traverses each confirmed valid result of queries containing the n-gram.

Boxes 322 and 336 represent an example outer iteration on the n-grams associated with the category (e.g., the supporters of the category). Box 322 represents a beginning of an iteration the supporters. The iteration can be repeated for all supporters of the category, or for a subset of the supporters of the category. An example subset of the supporters can be the related supporters, e.g., the n-grams that are supporters to the category and match the terms 158 in the text 152 to be classified. For convenience, the steps within the out loop will be described with respect to an n-gram being iterated upon.

In step 324, an inverse document frequency ("idf") value of the n-gram (e.g., the supporter of the category) can be calculated. The idf value of the n-gram is a measure the general importance of the n-gram in the corpus 102 of documents. The idf value of the n-gram can be calculated by, first, dividing the total number of documents in a corpus 102 by a number of documents in which the n-gram appears in order to obtain an inverse document frequency quotient, and, second, calculating a logarithm value of the inverse-document quotient. An example formula for calculating an idf value of the n-gram can be:

$$idf(x) = \log \frac{|D|}{|\{d_i : x \in d_i\}|} \quad (1)$$

in which x is the n-gram, idf(x) is the idf value of the n-gram x, the numerator is a total number of documents in a corpus D, and the denominator is a total number of document di's in which the n-gram x appears. The base of the logarithm can be any number (e.g., 2, e, 10, etc.) For example, when a corpus contains 100 million (100,000,000) documents, and the unigram "baseball" appears in 200,000 of the documents, the idf value of unigram "baseball" can be 6.21 (ln(100,000,000/200,000)=ln(500)≈6.21).

Boxes 326 and 334 represent example inner iteration on the confirmed search results. Box 326 represents a beginning of an iteration through the confirmed search results in response to queries in which the n-gram is an item. The n-gram can be a part of multiple distinct queries. Each distinct query can be linked to one or more documents (e.g., the one or more documents are the confirmed valid search results of the query), in which the one or more documents belong to the same category. Therefore, tf value of the n-gram can be calculated in relation to each of the documents. The iterations can be repeated for each confirmed search result, or for a subset of the confirmed search results in response to queries including the n-gram. For example, unigram "baseball" can be a component of both query 112 "baseball games youth" and query 113 "bay area baseball match." In response to query 112 "baseball games youth," a search engine retrieves document 104; in response to query 113 "bay area baseball match," a search engine retrieves document 106, where documents 104 and 106 in the category 108 "/sports/baseball/games/youth." Documents 104 and 106 are confirmed valid by a user click. Therefore, calculations can be made for unigram "baseball" in relation to both documents 104 and 106. The inner iterations for unigram "baseball" can traverse the two documents 104 and 106. For convenience, the inner iteration will be described with respect to a confirmed valid search result being iterated upon.

In step 328, a term frequency ("tf") value of the n-gram in relation to the confirmed valid search result is calculated. Calculating a tf value of the n-gram in relation to the confirmed valid search result can include dividing a number of times the n-gram appears in the confirmed valid search result by a length of the confirmed valid search result. For example, when the unigram "baseball" appears seven times in a the confirmed valid search result 104 that contains 140 words, the tf value of the unigram "baseball" in relation to the confirmed valid search result D1 can be 0.05 (7/140=0.05).

In step 330, the term frequency is multiplied by the inverse document frequency to acquire a tf-idf value of the n-gram in relation to a document which is confirmed valid content. For example, where the tf value of unigram "baseball" in relation to document D1 is 0.05, and the idf value of the unigram "baseball" in relation to the corpus 120 of documents is 6.21, the tf-idf value of unigram "baseball" in relation to document 104 can be 0.31 (6.21*0.05≈0.31).

In step 332, the tf-idf value of an n-gram in relation to the confirmed valid search result is added to the categories initial weight. An initial value of an initial weight of a category can be set to zero. In each iteration on the n-grams supporting the category and each iteration on the confirmed search result linked to the n-gram, the value of the initial weight of the category can thus be incremented. For example, when unigram "baseball" and document 104 are traversed first in the iterations where the tf-idf value of unigram "baseball" in relation to document 104 is 0.31, the initial weight is incremented to 0.31. The initial weight can be further incremented by further iterations.

In step 334, a termination condition is checked for the inner iterations repeated for valid content. In step 336, a termination condition is checked for iterations repeated for n-grams. At the end of the iterations, an initial weight of a category can be stored in association with the category.

In some implementations, the tf-idf value of the n-gram can be calculated without going through the inner iteration 324-334. As an alternative, the tf value of the n-gram can be calculated in relation to the text 152 being classified. The tf value of the n-gram in relation to the text 152 can be calculated by dividing a number of times the n-gram appears in the text 152 by a length of the text 152. For example, if the unigram "baseball" appeared in the text 152 five times, and text 152 is 125 words long, the tf value of unigram "baseball" in relation to the text 152 is 0.04 (5/125=0.04). The tf value 0.04 can be multiplied by the idf value (e.g., 6.21) to acquire a tf-idf value of the unigram "baseball," which is 0.25 (6.21*0.04≈0.25).

Figure 4:
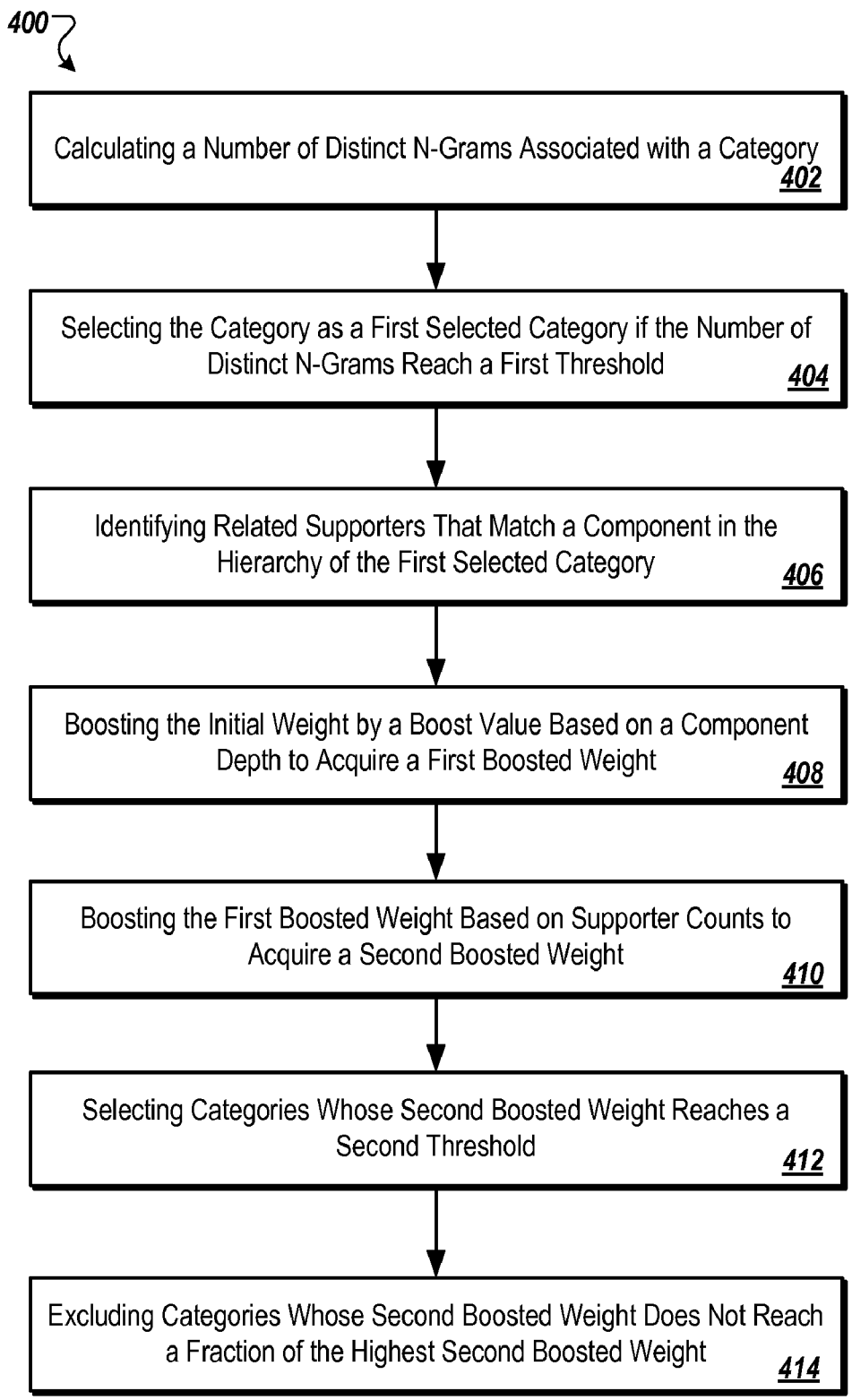
FIG. 4 is a flowchart illustrating example techniques for using heuristics in selecting categories from filtered comprehensive category graph.

FIG. 4 is a flowchart illustrating example techniques 400 for using heuristics in selecting categories from filtered comprehensive category graph 160. The techniques 400 can be applied to each category in the filtered comprehensive category graph 160. The techniques can correspond to applying heuristics as illustrated in FIG. 2A. The heuristics can be used to select categories from a filtered comprehensive category graph 160 based on the categories' initial weight, one or more boosting values, and one or more thresholds. For convenience, techniques 402 are described with respect to a detailed category in the filtered comprehensive category graph 160.

In step 402, a number of distinct n-grams associated with the detailed category is calculated. In some implementations, calculating the number of distinct n-grams includes counting all distinct n-grams supporting the detailed category. In some other implementation, calculating the number of distinct n-grams includes counting only related supporters (e.g., n-grams that are extracted from the queries linked to the category and match the terms 158 in the text 152 to be classified). For example, in system query graph 120, distinct related supporters to category "/sport/baseball/games/youth" are "baseball," "games," "youth," "bay area," and "march." The number of distinct unigrams is 5.

In step 404, the detailed category is selected as a first selected subject matter category if the number of distinct n-grams reaches a first threshold. A category having one or two supporters can be accident categories (e.g., a typographical error in ODP). A category having only one or two related supporters can be related to the text by accident. For example, a document describing a software program code-named "Beethoven" should not be classified under "/arts/music/genres/classical/composers/beethoven." The document describing the software program is unlikely to contain many supporters of category "/arts/music/genres/classical/composers/beethoven." A document that that is truly about the composer Beethoven will likely contain many terms supporting the category, such as "Ludwig," "symphony," etc. The first threshold value can be used to determine how many related terms are required in order for the detailed category to be selected.

In step 406, one or more related supporters that match a component (e.g., a refinement) in a hierarchy in the first selected category are identified. The level at which the component in the hierarchy positions (e.g., a level of refinement) is also identified. For example, when the first selected category is "/arts/music/genres/classical/" and a related supporter is "classical" (e.g., the term "classical" appears in both the queries linked to the category and the terms 158 of the text 152), the related supporter "classical" is identified. Also, a level of refinement can be identified as four.

In step 408, the initial weight of the first selected category is boosted by a first boost value that is commensurate with the component depth of the identified n-gram. After the boost, the initial weight of the first selected category can become a first boosted weight. The boost in step 408 can be used in recognition that the deeper a related supporter refines category, the better indication that the text 152 to be classified is closely related to the category. For example, for a detailed category "/arts/music/genres/classical/composers/beethoven," the refinement "arts" can have a level 1 refinement, "music," level 2, "genres," level 3, etc. A related supporter "composers" that matches with a level 4 refinement can better indicate that text 152 is closely related to the category than a supporter "music" which corresponds to a level 2 refinement. Therefore, the first boost value can be commensurate with the level of refinement to which the related supporter. In some implementations, the first boost value is the level of the refinement. For example, a related supporter "games" can match a level 3 refinement in tree 162 in comprehensive category graph 160. Therefore, the category "/sports/baseball/games" receives a first boost value of four. The first boost value can be added to or multiplied with the initial weight. The result can be a first boosted weight.

In step 410, the first boosted weight is further boosted by a second boost value to acquire a second boosted weight. The second boosted value can be commensurate with a number of n-grams associated with the first selected category. In some implementations, the number of n-grams associated with the first selected category can be the total number of n-grams supporting the first selected category (e.g., the sum of the supporter counts of the first selected category). In some other implementations, the number of n-grams associated with the first selected category can be the total number of related supporters of the first selected category. In step 410, the number of n-grams need not be based on distinct n-grams or terms. For example, in system category graph 120, unigrams that support category "/sport/baseball/games/youth" are "baseball" (supporter count=18), "games" (3), "youth" (3), "bay area" (15), and "march" (15). The count of unigrams can be 54 (18+3+3+15+15=54). The second boost value can be commensurate with the total number of supporters, e.g., the more the total number of supporters for a category, the higher the second boost value the category receives. The calculations in step 410 can be used to recognize how closely a category relates to the text 152 to be classified.

In step 412, the category whose second boosted weight reaches a second threshold is selected from the filtered comprehensive category graph 160. The second threshold can be used to fine-tune the number of detailed categories into which the text 152 is classified. The second threshold can be a constant value, or can be adjusted in accordance with the length of the text 152 to be classified to reflect the fact that the shorter the text 152, the fewer the related supporters there are.

In step 414, a category is excluded if the category's second boosted weight does not reach a fraction of a highest second boosted weight in the filtered comprehensive category graph 160. Step 414 can be applied to control the quality of the selected detailed categories. For example, the longer the text 152, the more terms 158 can be in the text 158, the more related supporters can be found. For long text 152, the number of detailed categories can be limited by the "top n most fit" categories, where the number n can be controlled by a category that is a top fit, e.g., the category that has the highest second boosted weight in the filtered comprehensive category graph 160. For example, when the highest second boosted weight is 80, and the fraction (which can be a third threshold) is 0.5, a category whose second boosted weight is less than 40 (80*0.5=40) can be excluded. The remaining detailed subject matter categories 170 can be designated as a fine-grained hierarchical classification of the text 152.

Figure 5:
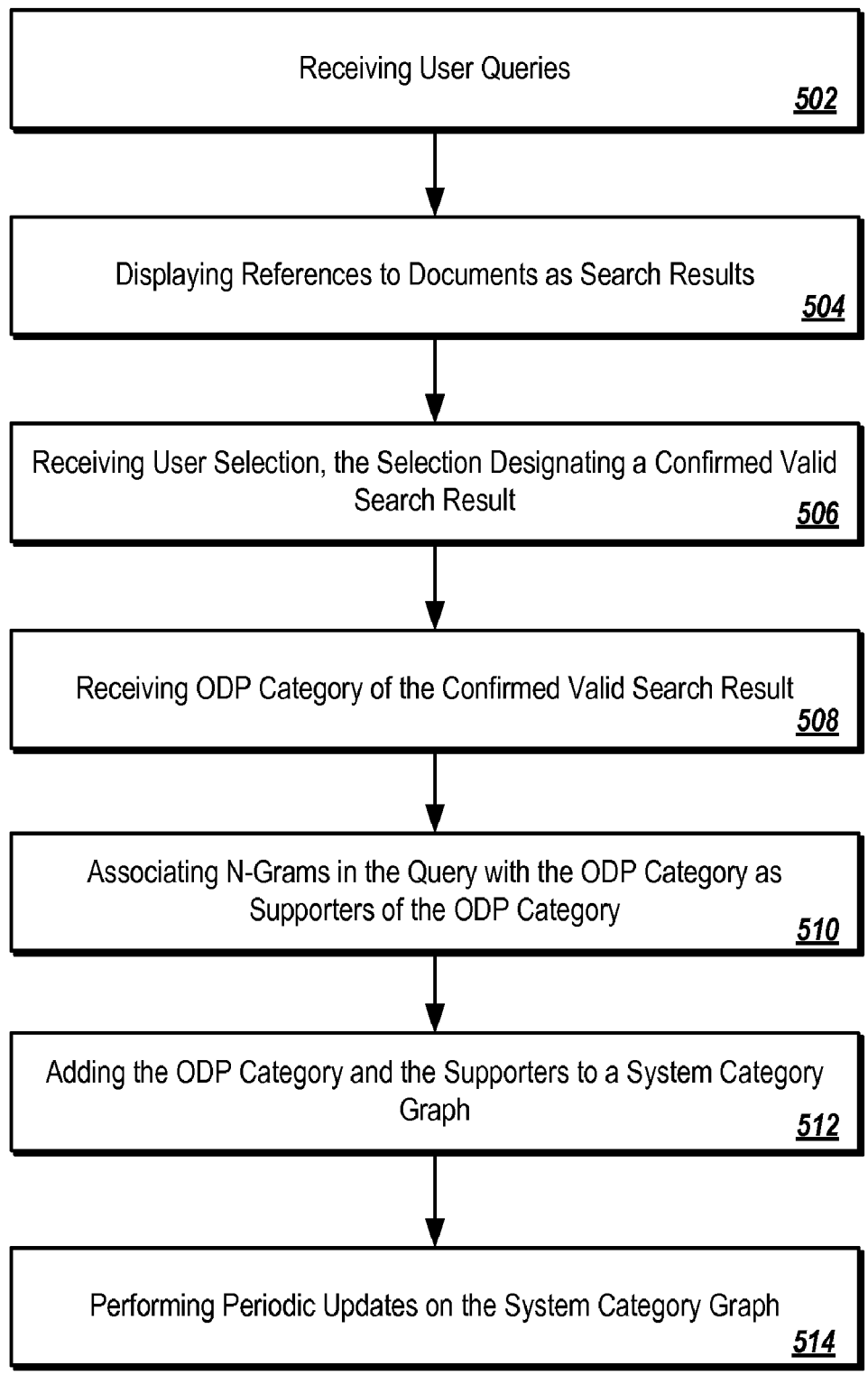
FIG. 5 is a flowchart illustrating example techniques for creating a system category graph.

FIG. 5 is a flowchart illustrating example techniques for creating a system category graph 120. A category graph contains categories and n-grams supporting the categories. The n-grams are linked to the categories by confirmed search results. In step 502, user search queries are received. A user search query can include one or more n-grams. The search queries entered by a population of users and the queries' n-grams can be stored on one or more storage devices.

In step 504, one or more references to documents are presented to a user as search results. A search engine can produce one or more search results in response to the search query. Any search engine can be used. Some example search engines are wikiseek, Yahoo! Search, or Ask.com. A search result can be a document (e.g., a Web page) or a reference to a document. In some implementations, Web links (e.g., URLs) to the documents are displayed on a user's display device. Summary information of a document, such as excerpt or keywords of the document, can be displayed together with a Web link to provide information to the user on the document to which the link is pointed.

In step 506, a user selection is received. A user selection can be a user's click on a link to a document. In some implementations, a document is designated as a confirmed valid search result for a query when a user clicks on a link that points to the document. In some implementations, a document is designated as a confirmed valid search result after the user clicks on the link that points to the document and after the user further views the document for a sufficiently long period of time. For example, a document can be designated as a confirmed valid search result of a query after a user clicks on the link to the document and has viewed the document for at least one minute.

In step 508, one or more ODP categories of the confirmed valid search result are acquired. The document (e.g., a Web page) in the confirmed valid search result can be classified into detailed subject matter categories in a variety of ways. For example, a detailed subject matter category of the document can be an ODP directory of the document in ODP. The ODP is available to the public on the World Wide Web. In the ODP, the electronic document is placed in one or more directories. The directories are hierarchical classifications (e.g., detailed categories) of the electronic document. A user can add, delete, and otherwise edit a directory (e.g., a category). The document can be assigned to the directories by a user in ODP. The document can be put into more than one directories, and thus belong to more than one categories, in the ODP. For example, the document can belong to one category based on the substantive content of the document (e.g., "/sports/baseball/games/events") and another category based on a geographical location (e.g., "/us/california/bay_area/palo_alto"). Classifying a document into categories can be accomplished in the backend. For example, the document can be classified into ODP categories when the author publishes the document or submits the document to the ODP.

In step 510, the n-grams in the search query are associated with the ODP categories of the document that is a confirmed valid search result. When a user confirms that a search result of the search query is valid by clicking on the link to the document, associations can be created between the search query and the categories of the search result. The n-grams in the search query can become supporters of the categories based on the association.

In step 512, the ODP categories and the n-grams are added to the system category graph 120 and stored on a storage device. The ODP categories are designated as the detailed subject matter categories in the system category graph 120. The n-grams are designated as the supporters of the categories. A reference to the confirmed valid search result (e.g., a URL link to the document, or a document ID) can be stored in association with the detailed categories and their supporters. A supporter count can also be calculated and stored.

In step 514, the stored system category graph 120 is periodically updated. A system category graph 120 can be constantly updated or periodically updated. The system category graph 120 can contain a large number of detailed categories, queries, and references to documents. In some implementations, updating the system category graph 120 can include creating a current system category graph which can be updated when new categories, new document references, and new search queries are created. In the mean while, the system category graph 120 can remain relatively stable. The current system category graphs can be merged with the system category graphs 120 periodically.

Figure 6:
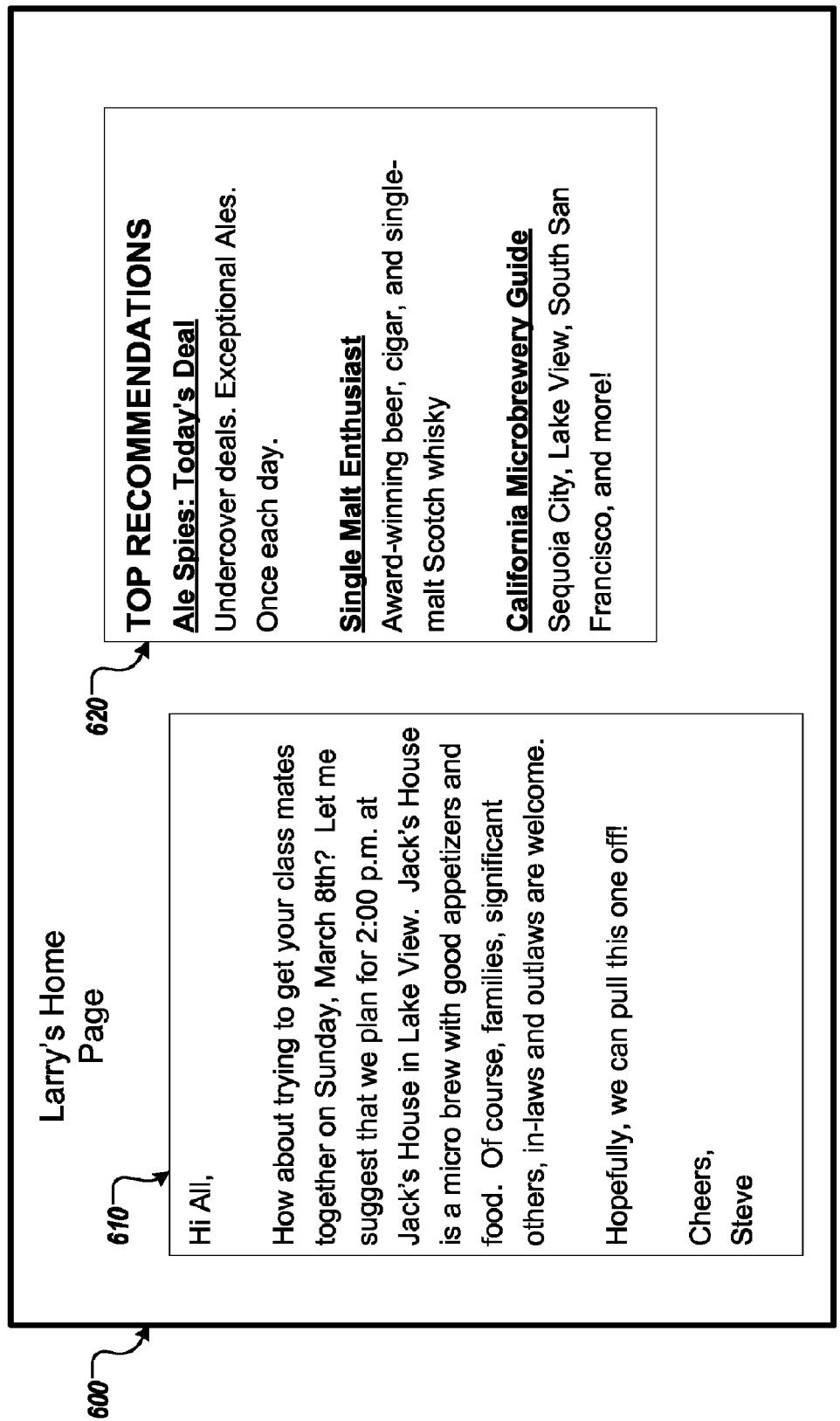
FIG. 6 illustrates an example graphical user interface in which recommendations are made to a user based on a detailed hierarchical classification of the text the user is viewing.

FIG. 6 illustrates an example display 600 where recommendations are made to a user based on a detailed hierarchical classification of the text the user is viewing. Example display 600 includes a content display area 610 and a recommendation area 620. In content display area 610, a user can view content. The content can be a Web page, an electronic mail message or attachment, or any other content that can be classified into high-level categories using a high-level text classifier and whose n-grams can be retrieved. The content can be further classified into detailed, or fine-grained, subject matter categories using the techniques described above with respect to FIG. 2. The detailed categories can be used to make recommendations to the user.

In a recommendation area 620, content that belongs to the one or more of the detail categories of the content in display area 610 is recommended to the user. The content can be documents in the ODP that belongs to the one or more of the detailed categories. By crawling an ODP directory that corresponds to a detailed category of the content in display area 610, documents that belongs to the detail category can be located. Recommending documents related to the content that the user is viewing in such a manner can give a user a better Web browsing experience. For example, a user viewing a message on a friend gathering at a restaurant in area 610 can receive recommendations on related Web pages (e.g., ale, whisky, and microbrewery information) in recommendation area 620.

FIG. 7 is a block diagram of a system architecture 700 for implementing the features and operations described in reference to FIGS. 1-6. Other architectures are possible, including architectures with more or fewer components. In some implementations, the architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to any medium that participates in providing instructions to a processor 702 for execution, including without limitation, non-volatile media (e.g., optical or magnetic disks), volatile media (e.g., memory) and transmission media. Transmission media includes, without limitation, coaxial cables, copper wire and fiber optics.

The computer-readable medium 712 further includes an operating system 714 (e.g., Mac OS® server, Windows® NT server), a network communication module 716, an index to a corpus of documents 718, categories of documents 720 (e.g., ODP), user queries 722, and recommendation generator 724. The corpus of documents 718, categories of document 720, and user queries 722 can be used to generate category graphs. Recommendation generator 724 can be used to generate recommendations to a user based on corpus of documents 718, categories of documents 720, and one or more documents that a user is viewing. The operating system 714 can be multi-user, multiprocessing, multitasking, multithreading, real time, etc. The operating system 714 performs basic tasks, including but not limited to: recognizing input from and providing output to the devices 706, 708; keeping track and managing files and directories on computer-readable mediums 712 (e.g., memory or a storage device); controlling peripheral devices; and managing traffic on the one or more communication channels 710. The network communications module 616 includes various components for establishing and maintaining network connections (e.g., software for implementing communication protocols, such as TCP/IP, HTTP, etc.).

The architecture 700 is one example of a suitable architecture for hosting a browser application having audio controls. Other architectures are possible, which include more or fewer components. The architecture 700 can be included in any device capable of hosting an application development program. The architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, in the example implementations, n-grams are based on words. It should be noted that n-grams can be based on letters, syllables, words, phrases, etc. Accordingly, other implementations are within the scope of the following claims.

What is claimed is:

1. A computer-implemented method comprising:
    classifying a text into first subject matter categories;
    identifying one or more second subject matter categories in a plurality of second subject matter categories, each of the second subject matter categories being a hierarchical classification of a plurality of confirmed valid search results for queries, and wherein at least one query for each identified second subject matter category comprises a term in the text;
    filtering the identified second subject matter categories by excluding identified second subject matter categories whose ancestors are not among the first subject matter categories;
    for each second subject matter category in the filtered second subject matter categories:
        extracting one or more constituent terms from the queries of whose confirmed valid search results the second subject matter category is the hierarchical classification, where the constituent terms appear in the text;
        calculating an initial weight of the second subject matter category, the calculating comprising determining a sum of term frequency-inverse document frequency (tf-idf) values of each extracted constituent term in relation to a corpus of documents; and
        selecting the second subject matter category based on the initial weight and based on a threshold where the threshold specifies a degree of relatedness between a selected subject matter category and the text; and
    where the selected second subject matter categories are a sufficient basis for recommending to a user content associated with one or more of the selected second subject matter categories.

2. The method of claim 1 in which calculating a tf-idf value of each extracted constituent term further comprises:
    calculating an inverse document frequency (idf) value of the constituent term in relation to the corpus of documents;
    calculating a term frequency (tf) value of the constituent term; and
    determining the tf-idf value of the extracted constituent term based on the idf value of the constituent term and the tf value of the constituent term.

3. The method of claim 2 in which calculating the idf value of the constituent term further comprises calculating an idf quotient, the calculating including dividing a total number of documents in the corpus by a number of documents in which the constituent term appears.

4. The method of claim 2 in which calculating the tf value of the constituent term further comprises dividing a number of times the constituent term appears in the text by a length of the text.

5. The method of claim 2 in which calculating the tf value of the constituent term further comprises:
    for each confirmed valid search result for the queries from which the constituent term is extracted:
        dividing a number of times the constituent term appears in the search result by a length of the search result to obtain a relative term frequency; and
        applying the relative term frequency to the tf value of the constituent term.

6. The method of claim 1, in which selecting the second subject matter category further comprises:
    calculating a number of distinct constituent terms in the extracted constituent terms; and
    selecting the second subject matter category as a first selected subject matter category if the number of distinct constituent terms satisfies a first threshold.

7. The method of claim 6 in which selecting the second subject matter category further comprises:
    identifying one or more constituent terms from the extracted constituent terms, the identified constituent terms matching a refinement in a hierarchy in the first selected subject matter category, the refinement having a level in the hierarchy;

19 boosting the initial weight of the first selected subject matter category by a first boost value to acquire a first boosted weight, the first boost value commensurate with the level of the refinement;

boosting the first boosted weight by a second boost value to acquire a second boosted weight, the second boost value commensurate with a total number of constituent terms in the extracted constituent terms; and selecting the first selected subject matter category if the second boosted weight of the first selected subject matter category satisfies a second threshold.

8. The method of claim 1, further comprising determining a confirmed valid search result by:

receiving a search query;

presenting one or more search results responsive to the search query; and receiving a selection of at least one search result from the one or more search results, the selection designating the confirmed valid search result.

9. A non-transitory computer-readable medium having instructions stored thereon, the instructions, when executed by one or more processors, cause the processors to perform operations comprising:

classifying a text into first subject matter categories;

identifying one or more second subject matter categories in a plurality of second subject matter categories, each of the second subject matter categories being a hierarchical classification of a plurality of confirmed valid search results for queries, and wherein at least one query for each identified second subject matter category comprises a term in the text;

filtering the identified second subject matter categories by excluding identified second subject matter categories whose ancestors are not among the first subject matter categories;

for each second subject matter category in the filtered second subject matter categories:

extracting one or more constituent terms from the queries of whose confirmed valid search results the second subject matter category is the hierarchical classification, where the constituent terms appear in the text;

calculating an initial weight of the second subject matter category, the calculating comprising determining a sum of term frequency-inverse document frequency (tf-idf) values of each extracted constituent term in relation to a corpus of documents; and selecting the second subject matter category based on the initial weight and based on a threshold where the threshold specifies a degree of relatedness between a selected subject matter category and the text; and where the selected second subject matter categories are a sufficient basis for recommending to a user content associated with one or more of the selected second subject matter categories.

10. The computer-readable medium of claim 9 in which calculating a tf-idf value of each extracted constituent term further comprises:

calculating an inverse document frequency (idf) value of the constituent term in relation to the corpus of documents;

calculating a term frequency (tf) value of the constituent term; and determining the tf-idf value of the extracted constituent term based on the idf value of the constituent term and the tf value of the constituent term.

20

11. The computer-readable medium of claim 10 in which calculating the idf value of the constituent term further comprises calculating an idf quotient, the calculating including dividing a total number of documents in the corpus by a number of documents in which the constituent term appears.

12. The computer-readable medium of claim 10 in which calculating the tf value of the constituent term further comprises dividing a number of times the constituent term appears in the text by a length of the text.

13. The computer-readable medium of claim 10 in which calculating the tf value of the constituent term further comprises:

for each confirmed valid search result for the queries from which the constituent term is extracted:

dividing a number of times the constituent term appears in the search result by a length of the search result to obtain a relative term frequency; and applying the relative term frequency to the tf value of the constituent term.

14. The computer-readable medium of claim 9 in which selecting the second subject matter category further comprises:

calculating a number of distinct constituent terms in the extracted constituent terms; and selecting the second subject matter category as a first selected subject matter category if the number of distinct constituent terms satisfies a first threshold.

15. The computer-readable medium of claim 14 in which selecting the second subject matter category further comprises:

identifying one or more constituent terms from the extracted constituent terms, the identified constituent terms matching a refinement in a hierarchy in the first selected subject matter category, the refinement having a level in the hierarchy;

boosting the initial weight of the first selected subject matter category by a first boost value to acquire a first boosted weight, the first boost value commensurate with the level of the refinement;

boosting the first boosted weight by a second boost value to acquire a second boosted weight, the second boost value commensurate with a total number of constituent terms in the extracted constituent terms; and selecting the first selected subject matter category if the second boosted weight of the first selected subject matter category satisfies a second threshold.

16. The computer-readable medium of claim 9, the operations further comprising determining a confirmed valid search result by:

receiving a search query;

presenting one or more search results responsive to the search query; and receiving a selection of at least one search result from the one or more search results, the selection designating the confirmed valid search result.

17. A system comprising:

one or more processors; and memory having instructions stored thereon, the instructions when executed by the one or more processors, cause the processors to perform operations comprising:

classifying a text into first subject matter categories;

identifying one or more second subject matter categories in a plurality of second subject matter categories, each of the second subject matter categories being a hierarchical classification of a plurality of confirmed valid search results for queries, and wherein at least one query for each identified second subject matter category comprises a term in the text;
filtering the identified second subject matter categories by excluding identified second subject matter categories whose ancestors are not among the first subject matter categories;
for each second subject matter category in the filtered second subject matter categories:
extracting one or more constituent terms from the queries of whose confirmed valid search results the second subject matter category is the hierarchical classification, where the constituent terms appear in the text;
calculating an initial weight of the second subject matter category, the calculating comprising determining a sum of term frequency-inverse document frequency (tf-idf) values of each extracted constituent term in relation to a corpus of documents; and
selecting the second subject matter category based on the initial weight and based on a threshold where the threshold specifies a degree of relatedness between a selected subject matter category and the text; and
where the selected second subject matter categories are a sufficient basis for recommending to a user content associated with one or more of the selected second subject matter categories.

18. The system of claim 17 in which calculating a tf-idf value of each extracted constituent term further comprises:
calculating an inverse document frequency (idf) value of the constituent term in relation to the corpus of documents;
calculating a term frequency (tf) value of the constituent term; and
determining the tf-idf value of the extracted constituent term based on the idf value of the constituent term and the tf value of the constituent term.

19. The system of claim 18 in which calculating the idf value of the constituent term further comprises calculating an idf quotient, the calculating including dividing a total number of documents in the corpus by a number of documents in which the constituent term appears.

20. The system of claim 18 in which calculating the tf value of the constituent term further comprises dividing a number of times the constituent term appears in the text by a length of the text.

21. The system of claim 18 in which calculating the tf value of the constituent term further comprises:
for each confirmed valid search result for the queries from which the constituent term is extracted:
dividing a number of times the constituent term appears in the search result by a length of the search result to obtain a relative term frequency; and
applying the relative term frequency to the tf value of the constituent term.

22. The system of claim 17 in which selecting the second subject matter category further comprises:
calculating a number of distinct constituent terms in the extracted constituent terms; and
selecting the second subject matter category as a first selected subject matter category if the number of distinct constituent terms satisfies a first threshold.

23. The system of claim 22 in which selecting the second subject matter category further comprises:
identifying one or more constituent terms from the extracted constituent terms, the identified constituent terms matching a refinement in a hierarchy in the first selected subject matter category, the refinement having a level in the hierarchy;
boosting the initial weight of the first selected subject matter category by a first boost value to acquire a first boosted weight, the first boost value commensurate with the level of the refinement;
boosting the first boosted weight by a second boost value to acquire a second boosted weight, the second boost value commensurate with a total number of constituent terms in the extracted constituent terms; and
selecting the first selected subject matter category if the second boosted weight of the first selected subject matter category satisfies a second threshold.

24. The system of claim 17, the operations further comprising determining a confirmed valid search result by:
receiving a search query;
presenting one or more search results responsive to the search query; and
receiving a selection of at least one search result from the one or more search results, the selection designating the confirmed valid search result.

* * * * *